(12) United States Patent
Murree et al.

(10) Patent No.: US 8,549,790 B2
(45) Date of Patent: Oct. 8, 2013

(54) WEATHERSTRIP ASSEMBLY

(75) Inventors: Stephen J. Murree, Macomb, MI (US);
Vaughn Holloway, Clarkston, MI (US);
Robert Krueger, Grosse Ile, MI (US)

(73) Assignee: Henniges Automotive Sealing Systems North America, Inc., Dover, DE (US)

( * ) Notice: Subject to any disclaimer, the term of this patent is extended or adjusted under 35 U.S.C. 154(b) by 0 days.

(21) Appl. No.: 13/566,283

(22) Filed: Aug. 3, 2012

(65) Prior Publication Data

US 2013/0031842 A1    Feb. 7, 2013

Related U.S. Application Data

(60) Provisional application No. 61/514,652, filed on Aug. 3, 2011.

(51) Int. Cl.
*B60J 1/16* (2006.01)
(52) U.S. Cl.
USPC ............................................. 49/377; 49/495.1
(58) Field of Classification Search
USPC .................................. 49/372, 374, 377, 495.1
See application file for complete search history.

(56) References Cited

U.S. PATENT DOCUMENTS

| | | |
|---|---|---|
| 2,198,290 A | 4/1940 | Place |
| 4,046,940 A | 9/1977 | Prikkel, III |
| 4,119,325 A | 10/1978 | Oakley et al. |
| 4,442,634 A | 4/1984 | Kimura |
| 4,696,128 A * | 9/1987 | Fukuhara ..................... 49/492.1 |
| 4,949,507 A | 8/1990 | Vaughan |
| 5,199,760 A | 4/1993 | Vering |
| 5,261,188 A | 11/1993 | Vaughan |
| 5,388,371 A | 2/1995 | Nozaki |
| 5,433,038 A | 7/1995 | Dupuy |
| 5,463,831 A | 11/1995 | Shinagawa et al. |
| 5,775,030 A * | 7/1998 | Hamabata ..................... 49/377 |
| 5,799,442 A * | 9/1998 | Takahashi et al. ............ 49/377 |
| 6,070,363 A | 6/2000 | Vance |
| 6,128,859 A | 10/2000 | Vance |
| 6,282,840 B1 | 9/2001 | Vance |
| 6,321,490 B1 | 11/2001 | Vance |
| 6,409,251 B1 * | 6/2002 | Kaye et al. ................ 296/146.9 |
| 6,446,392 B1 | 9/2002 | Maki |
| 6,668,489 B2 | 12/2003 | Baba et al. |
| 7,052,021 B2 | 5/2006 | Plottnik |
| 7,171,785 B1 | 2/2007 | Kelly et al. |

(Continued)

FOREIGN PATENT DOCUMENTS

EP    437974 A2 *  7/1991

*Primary Examiner* — Jerry Redman
(74) *Attorney, Agent, or Firm* — Howard & Howard Attorneys PLLC

(57) ABSTRACT

A weatherstrip assembly for sealing between a frame and a closure member of a vehicle is provided. The weatherstrip includes a retaining clip having a mounting portion for securing the weatherstrip to the frame and having an outwardly extending leg defining a first channel. The weatherstrip also includes a cover having a first flange protruding downward from the concealing member to extend at least partially into the first channel. The weatherstrip also includes a seal member having a body portion and at least one sealing protrusion extending outwardly from the body portion. The body portion has an upper end and a lower end. The lower end is sandwiched between the leg of the retaining clip and the first flange of the cover. The cover further includes a retaining tab extending outwardly opposite from the concealing member, with the retaining tab engaging the upper end of the body portion.

20 Claims, 4 Drawing Sheets

(56) References Cited

U.S. PATENT DOCUMENTS

| | | |
|---|---|---|
| 7,565,771 B2 | 7/2009 | Brocke |
| 7,934,341 B2 | 5/2011 | Knight et al. |
| 8,104,227 B2 | 1/2012 | Tamura |
| 8,205,389 B1 * | 6/2012 | Kesh ............... 49/440 |
| 2002/0134022 A1 | 9/2002 | Maki |

* cited by examiner

WEATHERSTRIP ASSEMBLY

CROSS-REFERENCE TO RELATED APPLICATION

This application claims the benefit of U.S. Provisional Application No. 61/514,652, filed on Aug. 3, 2011, the disclosure of which is incorporated by reference in its entirety.

TECHNICAL FIELD

The subject invention relates to a weatherstrip assembly for a vehicle and more specifically to a weatherstrip assembly for disposition adjacent to a closure member.

BRIEF DESCRIPTION OF THE DRAWINGS

Advantages of the present invention will be readily appreciated as the same becomes better understood by reference to the following detailed description when considered in connection with the accompanying drawings.

SUMMARY OF INVENTION

A weatherstrip assembly for sealing between a frame and a closure member of a vehicle is provided. The weatherstrip assembly includes a retaining clip having a mounting portion for securing the weatherstrip assembly to the frame and having an outwardly extending leg defining a first channel. The weatherstrip assembly also includes a cover having a first flange protruding downward from the concealing member to extend at least partially into the first channel. The weatherstrip assembly also includes a seal member having a body portion and at least one sealing protrusion extending outwardly from the body portion. The body portion has an upper end and a lower end extending from the upper end. The lower end is sandwiched between the leg of the retaining clip and the first flange of the cover to at least partially secure said seal member to said retaining clip. The cover further includes a retaining tab extending outwardly opposite from the concealing member with the retaining tab engaging the upper end of the body portion to further secure said seal member to said retaining clip.

DETAILED DESCRIPTION

Figure 1:
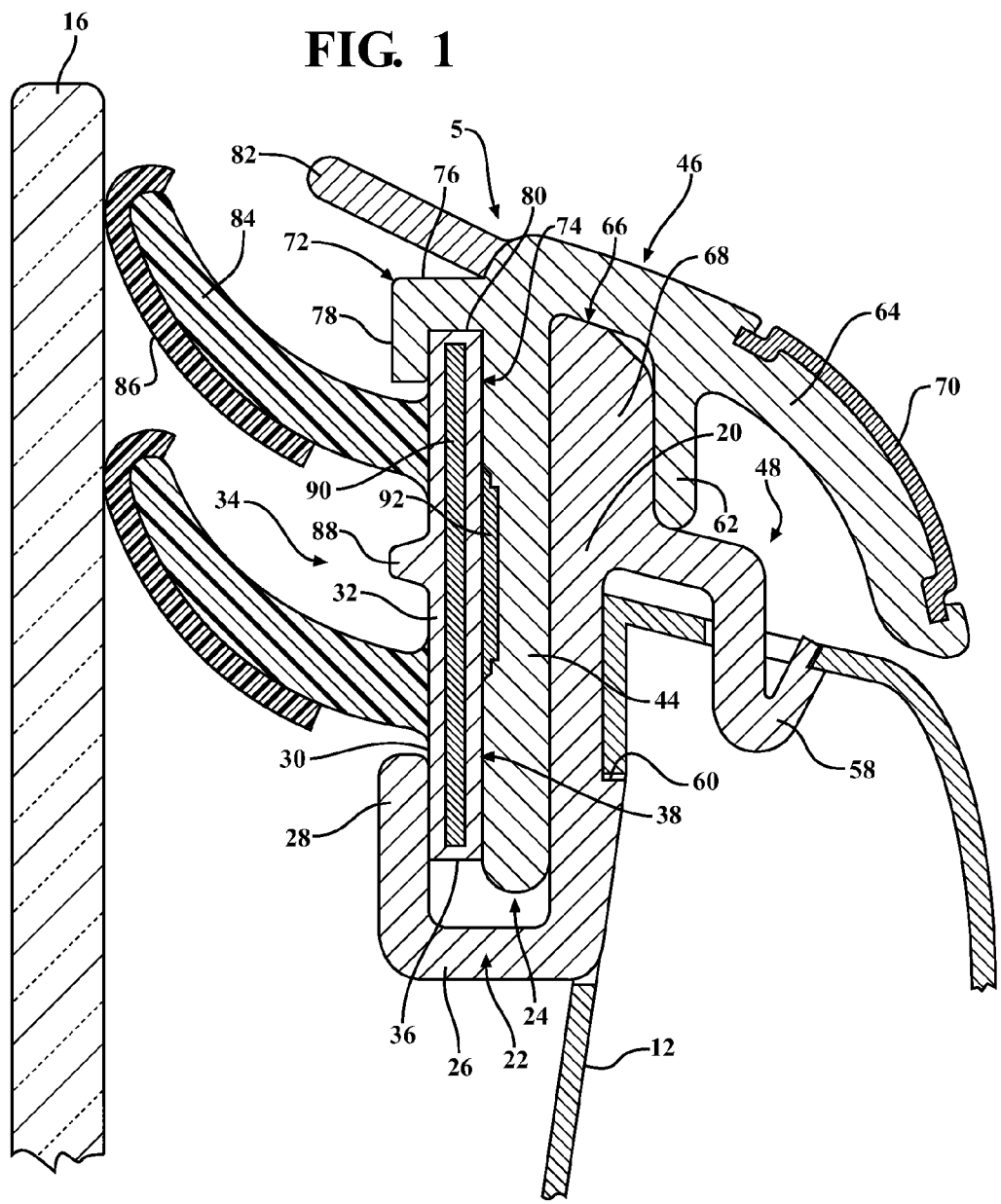
FIG. 1 is a cross-sectional view of a weatherstrip assembly in accordance with one embodiment of the present invention.

Referring to FIG. 1, wherein like numerals indicate like or corresponding parts throughout the several views, a weatherstrip assembly 5 is provided for use in association with a vehicle, such as an automobile. The vehicle includes a frame 12 and a closure member 16, such as on a door, a window, or trunk. The frame 12 may change size and shape throughout its longitudinal and latitudinal dimensions. The door includes at least one door panel having an upper edge. The weatherstrip assembly 5 may also be used in other applications having windows or doors, such as agricultural and industrial vehicles, buildings, and other applications that advantageously prevent materials from exiting adjacent a window or door gap. In the embodiment shown in FIG. 1, the weatherstrip assembly 5 is provided adjacent to a window pane 16 such that the closure member is defined as the window pane in this embodiment.

Figure 2:
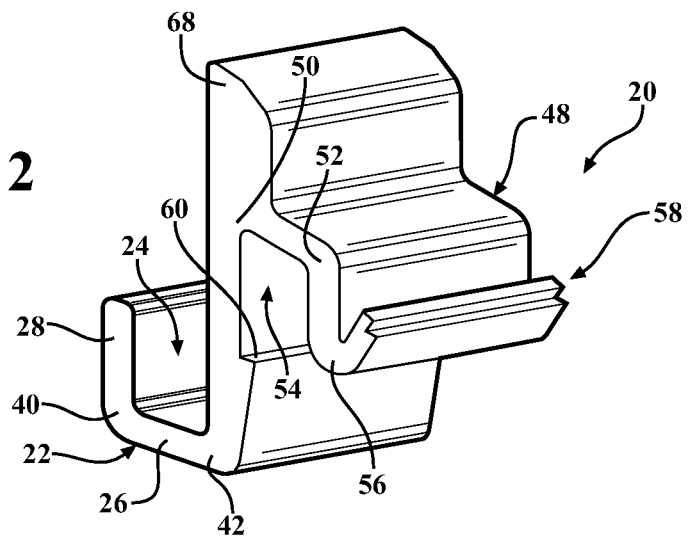
FIG. 2 is a perspective view of a retaining clip for the weatherstrip assembly of FIG. 1 in accordance with one embodiment of the present invention.

Referring to FIG. 2, along the length of the weatherstrip assembly 5, at least one retaining clip 20 is to be included. Along the entire span of the weatherstrip assembly 5, any number of retaining clips 20 may be provided, ranging from 1 to 20, or from 3 to 10. The retaining clip 20 attaches and secures the weatherstrip assembly 5 to the frame 12. The retaining clips 20 are placed along the weatherstrip assembly at a distance ranging from 1 to 200, 50 to 175, or 75 to 150 mm from one another.

The retaining clip 20 may comprise a rigid material, such as hard plastic, metal, or rubber. However, it is also contemplated that the retaining clip 20 comprises a flexible material such as an elastomeric material. The retaining clip 20 may be molded or extruded.

The retaining clip 20 comprises an outwardly extending leg 22 defining a first channel 24. In certain embodiments, and referring again to FIGS. 2 and 3, the leg 22 is further defined as having a first lateral arm 26 and an upward arm 28 extending upward from the first lateral arm 26. Referring again to FIG. 2, the retaining clip 20 may also include a first bend point 40 and a second bend point 42. The first bend point 40 and the second bend point 42 cooperate to define the first channel 24. The first bend point 40 may also represent the connecting joint between the first lateral arm 26 and the upward arm 28.

The retaining clip 20 also has a mounting portion 48 for securing the weatherstrip assembly 5 to the frame 12. The mounting portion 48 may comprise a third bend point 50 and a fourth bend point 52. The third bend point 50 and the fourth bend point 52 cooperate to define a second channel 54, facing downward, for mounting the retaining clip 20 on the frame 12. The second channel 54 may have a width suitable to engage the frame 12, and prevent movement of the retaining clip 20 relative to the frame 12. The second channel 54 has a depth suitable to accommodate the frame 12.

The retaining clip 20 further comprises a projection 68 that extends upwardly from the third bend point 50. The projection 68 of the retaining clip 20 is vertically oriented and may have a variety of shapes and sizes.

The mounting portion 48 may further include a fifth bend point 56. The fourth bend point 52 and the fifth bend point 56 cooperate to define a hook member 58 for securing the retaining clip 20 to the frame 12. The hook member 58 may face upward, but it may also face downward depending on the configuration of the frame 12. The hook member 58 is dimensioned and shaped to engage a feature of the frame 12, such as a hole, groove, or indentation.

The first, second, third, fourth, and fifth bend points may be angled at varying degrees in either direction. Each of the first, second, third, fourth, and fifth bend points may be angled at different degrees from one another.

The retaining clip 20 further comprises a notch 60. The notch 60 is located between the second bend point 42 and the third bend point 50. The notch 60 engages the frame 12 to prevent vertical movement of the retaining clip 20 relative to the frame 12. The notch 60 may be an indentation in the retaining clip 20 that allows the retaining clip 20 to lock into place relative the frame 12. The notch 60 may have various dimensions.

The various components of the retaining clip 20 may change size and shape depending on the dimension and size of the frame 12 where the retaining clip 20 engages the frame. As such, different size retaining clips 20 may be used along the longitudinal dimension of the frame 20. For example, the mounting portion 48, the hook member 58, the notch 60, and the second channel 54, may each independently change dimension based on the dimension of the frame 12 at the location which the retaining clip 20 engages the frame 12.

Figure 3:
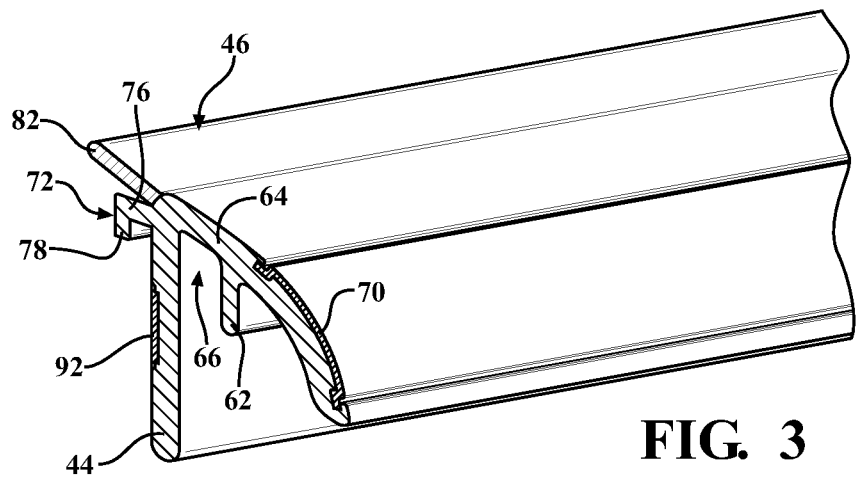
FIG. 3 is a cross-sectional perspective view of a cover for the weatherstrip assembly of FIG. 1 in accordance with one embodiment of the present invention.

Referring to FIG. 3, the weatherstrip assembly also includes a cover 46. The cover 46 serves as an outer decorative component and is made from material which meets color, gloss and weatherability requirements of the individual application. In one preferred embodiment, the cover 46 is molded and made preferably of a colored, weatherable grade, acrylic-styrene-acrylonitrile polycarbonate (ASA/PC) alloy. However, the cover 46 may comprise combinations of nylon alloy materials, such as ASA, thermoplastic (TPO), polyacrylate polyvinyl chloride (PVC) and the like. Also, the cover 12 may be made of a film-laminated thermoplastic material, such as acrylonitrile-butadiene-styrene (ABS), polyethylene teraphthalate (PET), and polybutylene teraphthalate (PBT) and the like. In addition, the cover 46 may comprise body-matched painted thermoplastic material from any variety of thermoplastic families based on ABS, PET, PBT, nylon, PA, and the like.

The cover 46 includes a first flange 44. The cover 46 may also include a second flange 62. The cover 46 further includes a concealing member 64 with the first flange 44 and the second flange 62 each protruding downward from the concealing member 64 with the first flange 44 and the second flange 62 cooperating to form a third channel 66. The first flange 44 and the second flange 62 may have different lengths. In the embodiment shown, the first flange 44 has a greater length than the second flange 62.

The concealing member 64, the first flange 44, and/or second flange 62 may be integrally formed, molded, or extruded to form the cover 46. Alternatively, the concealing member 64, first flange 44, and/or second flange 62 may be separately formed and joined or connected after formation to form the cover 46.

The concealing member 64 may have a dimension and shape suitable to at least partially conceal, or completely conceal, the mounting portion 48 of the retaining clip 20. The concealing member 64 may have a curved shape, a curvilinear shape, a rectangular shape, or a polygonal shape.

The concealing member 64 can include an externally-facing insert 70. The externally-facing insert 70 may comprise metal or plastic, such as stainless steel or chrome. The externally-facing insert 70 may be painted or coated with various materials. The externally-facing insert 70 may also have various dimensions, such that at least a portion of the externally-facing insert 70 is visible from outside the motor vehicle when the weatherstrip assembly 5 is installed on the frame 12.

The cover 46 may further comprise a rear projection 82 that extends obliquely from the cover 46 opposite the concealing member 64. The rear projection 82 may comprise a different material than the cover 46 and the concealing member 64, and my be attached thereto with co-extrusion, over-molding or similar processes. The rear projection 82 may comprise a flexible material, such as ethylene-propylene-diene-monomer (EPDM), Santoprene® thermoplastic elastomer (TPE), thermoplastic vulcanates and the like having a 50-70 shore hardness. The rear projection 82 functions to shed water away from the glass pane. The rear projection 82 may also seal a gap with trim located on a pillar of the vehicle.

Figure 4:
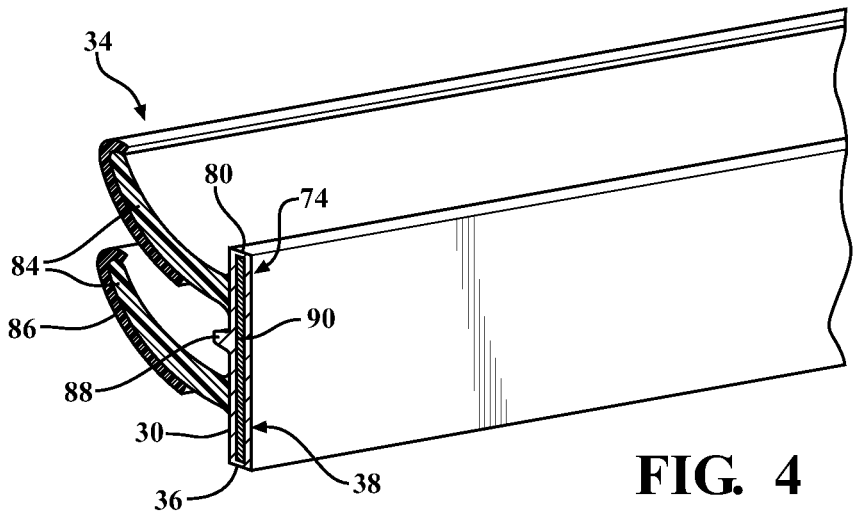
FIG. 4 is a cross-sectional perspective view of a seal member for the weatherstrip assembly of FIG. 1 in accordance with one embodiment of the present invention.
Figure 5:
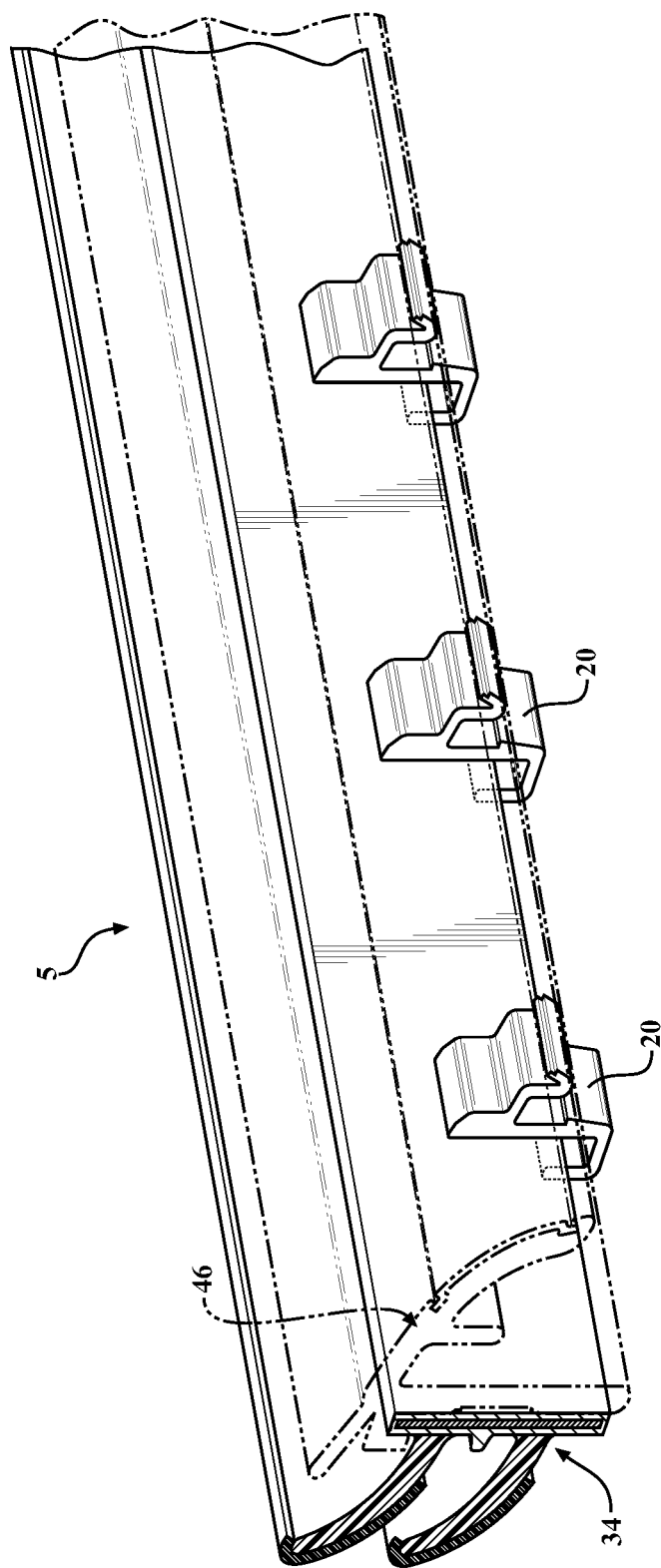
FIG. 5 is a partially cross-sectional perspective view of the weatherstrip assembly of FIG. 1 in accordance with one embodiment of the present invention with a cover shown in phantom.

Referring now to FIG. 4, the weatherstrip assembly includes a seal member 34. The seal member 34 includes a body portion 32 and at least one sealing protrusion 84 extending outwardly from the body portion 32 from an outward face 30. The seal member 34 may have a bottom 36 and a top 80. The body portion 32 has an upper end 74 and a lower end 38 further spaced from the upper end 74. The body portion 32 may be vertically-oriented in the preferred embodiment, and secures the seal member 34 in a vertical plane adjacent to the cover 46. The lower end 38 is sandwiched between the leg 22 of the retaining clip 20 and the first flange 44 of the cover 46 to at least partially secure the seal member 34 to the retaining clip 20.

Referring again to FIG. 1, the at least one sealing protrusion 84 has a surface 86 for contacting the closure member, such as the window pane 16 or door of the vehicle. The window pane 16 can be slid up and down in contact with the at least one sealing protrusion 84 to seal a gap between the window pane 16 and an upper edge of the door panel.

The seal member 34, the body portion 32, and the sealing protrusions 84 may each independently comprise a variety of materials, such as a flexible elastomeric material such as rubber, ethylene-propylene-diene-monomer (EPDM), Santoprene® thermoplastic elastomer (TPE), thermoplastic vulcanates and the like. If desired, the body portion 32 may comprise a distinct material from the at least one sealing protrusion 84, preferably a semi-rigid elastomeric material such as rubber, ethylene-propylene-diene-monomer (EPDM), Santoprene® thermoplastic elastomer (TPE) and the like.

In certain embodiments, the body portion 32 is more rigid that the at least one sealing protrusion 84. The body portion 32 may include a reinforcing member 90 adjacent to the body portion 32. Alternatively, the reinforcing member 90 may be mounted to the body portion 32. Alternatively still, the reinforcing member 90 may be coextruded with an elastomeric material to form the body portion 32, or may be attached to the body portion 32 as a separate component with adhesive tape or other fastener. The reinforcing member 90 may be encapsulated by the body portion 32. If coextruded or molded, the reinforcing member 90 may be fully surrounded or encapsulated by the elastomeric material. The reinforcing member 90 may provide strength, rigidity, and dimensional stability to the seal member 34. The reinforcing member 90 may comprise a metal, hard plastic, or fiberglass.

The surface 86 of the at least one sealing protrusion 84 may comprise flocking to prevent the at least one sealing finger from damaging the window pane 16. The flocking may comprise a low friction surface for sliding and sealing with the window pane 16.

In the embodiment shown, the at least one sealing protrusion 84 is further defined as having at least two sealing fingers. The at least one sealing protrusion may each independently have its own length, such that the at least one sealing protrusion includes a sealing finger having a first length, a sealing finger having a second length, and other length combinations, with the first length being longer or shorter than the second length. Alternatively, the at least one sealing protrusion 84 may also be defined as at least one sealing bulb, at least one sealing flange, or combinations thereof, suitable to seal a gap between the closure member 16 and the frame 12. Furthermore, it is also contemplated that each sealing protrusion may each independently have a different shape.

The body portion 32 may optionally comprise a ridge 88 which is disposed between the at least two sealing protrusions 84. The ridge 88 may serve as an installation aid when activating the adhesive member. For example, the ridge 88 may engaged during the wetting of the adhesive member or may serve as guide when pressing the seal member 34 into the adhesive member.

Figure 6:
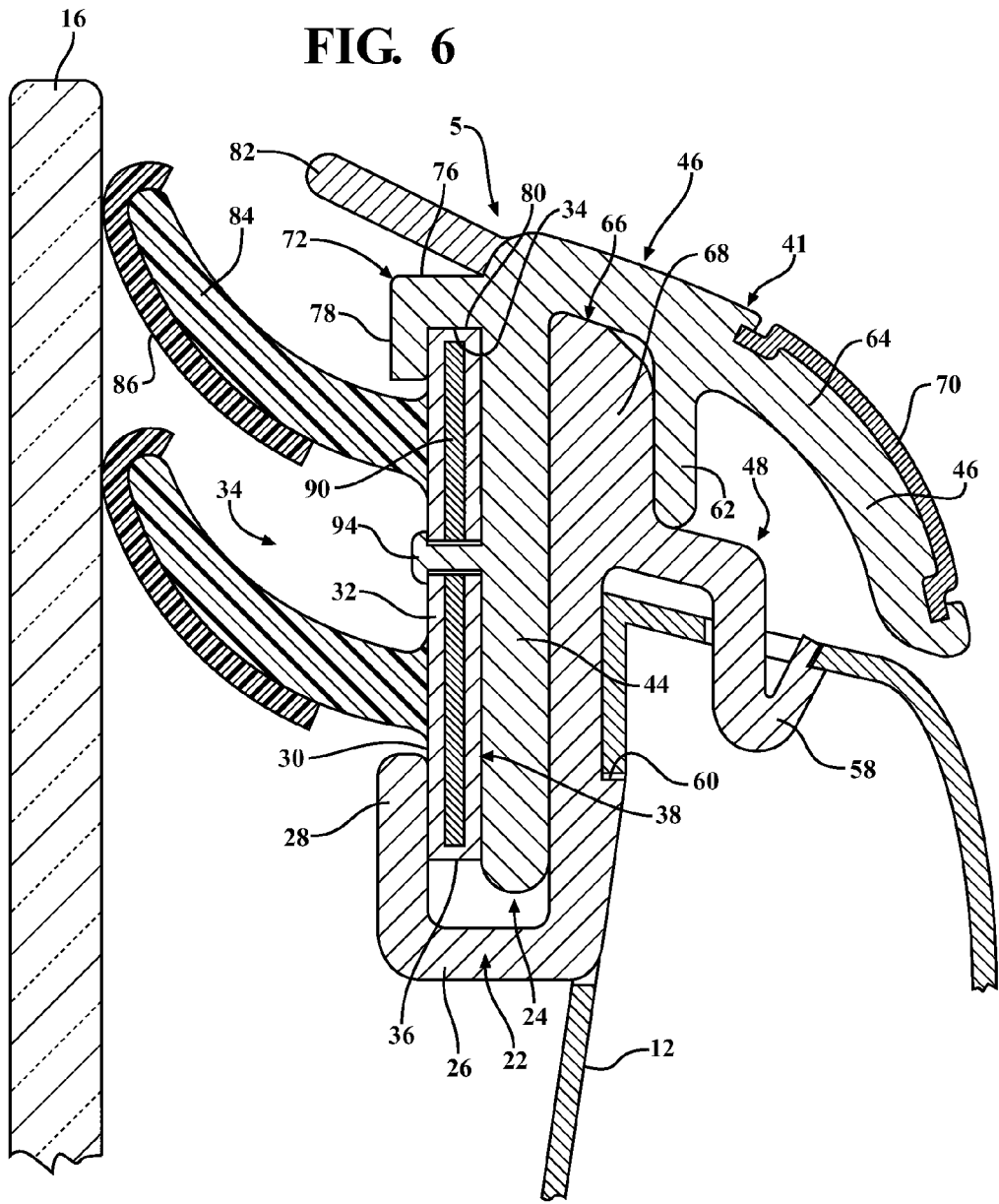
FIG. 6 is a cross-sectional view of an alternative weatherstrip assembly.

In an alternative embodiment shown in FIG. 6, the seal member 34 is secured in position relative to the retaining clip 20 and the cover 46 with a heat stake 94. The heat stake 94 may be integrally formed with the first flange 44. The seal member 34 may include a hole dimensioned to accommodate the heat stake 94. Once the hole in the seal member 34 is positioned over the heat stake 94 and the body portion 32 is positioned adjacent to the first flange 44, the heat stake 94 is activated using heat to secure the seal member 34 relative to the first flange 44. The heat stake 94 may be intermittently positioned along the longitudinal dimension of the weatherstrip assembly, with the heat stakes positioned at distance of 1, 5, 10, 15, 20, 25, 30, 35, or 40 mm from one another.

Referring again to FIG. 1, the upward arm 28 of the retaining clip 20 may engage the outward face 30 of the body portion 32 of the seal member 34. The first lateral arm 26 engages the bottom 36 of the lower end 38 of the body portion 32. The first channel 24 may face upward and may have a width suitable to fit both the lower end 38 of the seal member 34 and the first flange 44 of the cover 46. The first flange 44 and the second flange 62 may be oriented in a parallel fashion relative to the body portion 32 of the seal member 34, but may be oriented in a bent configuration relative to one another. The first channel 24 has a depth suitable to retain the lower end 38 of the seal member 34 and the bottom of the first flange 44. The retaining clip 20 may also include the projection 68 to engage the third channel 66.

The cover 46 further comprises a retaining tab 72 that extends outwardly opposite from the concealing member 64. The retaining tab 72 engages the upper end 74 of the body portion 32 to prevent vertical and horizontal movement of the seal member 34 relative the cover 46. The retaining tab 72 may also engage the upper end of the body portion 32 to further secure the seal member to the retaining clip 20. The retaining tab 72 may further be defined as a second lateral arm 76 and a downward arm 78 extending downward from the second lateral arm 74, with the downward arm 78 engaging the outward face 30 of the body portion 32. The second lateral arm 76 may engage the top 80 of the upper end 74 of the body portion 32.

The weatherstrip assembly may further include an adhesive member 92 disposed between the seal member 34 and the first flange 44 for securing the seal member 34 into position relative to the first flange 44. The adhesive member 92 may be further defined as tape, glue or other adhesive. In certain embodiments, the adhesive member 92 comprises double-sided tape. The adhesive member 92 may be applied continuously along the length of the weatherstrip assembly 5, or it may be applied intermittently in segments, at a distance of 5, 10, 20, 30, 40, or 50 mm from the adjacent segment.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. A weatherstrip assembly for sealing between a frame and a closure member of a vehicle, said weatherstrip assembly comprising:

a retaining clip having a mounting portion for securing said weatherstrip assembly to the frame and having an outwardly extending leg defining a first channel, a cover having a concealing member for at least partially concealing said mounting portion of said retaining clip and the frame, and having a first flange protruding downward from said concealing member to extend at least partially into said first channel;

a seal member having a body portion and at least one sealing protrusion extending outwardly from said body portion, said body portion having an upper end and a lower end extending from said upper end, said lower end being sandwiched between said leg of said retaining clip and said first flange of said cover to at least partially secure said seal member to said retaining clip;

said cover further comprising a retaining tab extending outwardly opposite from said concealing member with said retaining tab engaging said upper end of said body portion to further secure said seal member to said retaining clip.

2. The weatherstrip assembly of claim 1 wherein said retaining clip further includes a first bend point and a second bend point which cooperate to define said first channel and wherein said mounting portion comprises a third bend point and a fourth bend point which cooperate to define a second channel for mounting said retaining clip on the frame.

3. The weatherstrip assembly of claim 2 wherein said mounting portion further includes a fifth bend point with said fourth bend point and said fifth bend point cooperating to define a hook member for securing said retaining clip to the frame.

4. The weatherstrip assembly of claim 3 wherein said cover further includes a second flange protruding downward from said concealing member with said first flange and said second flange cooperating to form a third channel.

5. The weatherstrip assembly of claim 4 wherein said retaining clip further includes a projection extending upwardly from said third bend point to engage said third channel.

6. The weatherstrip assembly of claim 1 wherein each of said at least one sealing protrusion has a surface for contacting a window pane of the vehicle such that the window pane can be slid up and down in contact with said at least one sealing protrusion to seal a gap between the window pane and the frame.

7. The weatherstrip assembly of claim 6 wherein said surface of said at least one sealing protrusion comprises flocking.

8. The weatherstrip assembly of claim 1 wherein said at least one sealing protrusion is further defined as at least two sealing fingers.

9. The weatherstrip assembly of claim 8 wherein said body portion further comprises a ridge disposed between said at least two sealing fingers, wherein said ridge extends outwardly from said body portion.

10. The weatherstrip assembly of claim 1 further comprises a reinforcing member adjacent to said body portion of said seal member.

11. The weatherstrip assembly of claim 10 wherein said reinforcing member is fully encapsulated by said body portion.

12. The weatherstrip assembly of claim 1 wherein said leg is further defined as a first lateral arm and an upward arm extending downward from said first lateral arm with said upward arm engaging an outward face of said body portion, and where said retaining tab is further defined as a second lateral arm and a downward arm extending downward from said second lateral arm, with said downward arm engaging said outward face of the body portion, such that said seal member is secured into position relative to said retaining clip and said cover without the use of adhesives.

13. The weatherstrip assembly of claim 1 further including an adhesive member disposed between said body portion and said first flange for securing said seal member into position relative to said first flange.

14. The weatherstrip assembly of claim 1 wherein said cover further comprises a rear projection extending obliquely from said concealing member and being located above said retaining tab.

15. A weatherstrip assembly for sealing between a frame and a closure member of a vehicle, said weatherstrip assembly comprising:
 a retaining clip having a mounting portion for securing said weatherstrip assembly to the frame and having an outwardly extending leg defining a first channel,
 a cover having a concealing member for at least partially concealing said mounting portion of said retaining clip and the frame, and having a first flange and a second flange, said first flange protruding downward from said concealing member to extend at least partially into said first channel; said second flange protruding downward from said concealing member, with said first flange and said second flange cooperating to define a third channel, wherein said retaining clip further comprises a projection extending upwardly to engage said third channel,
 a seal member having a body portion and at least one sealing protrusion extending outwardly from said body portion, said body portion having an upper end and a lower end spaced from said upper end, said lower end being sandwiched between said leg of said retaining clip and said first flange of said cover to at least partially secure said seal member to said retaining clip; and
 said cover further comprising a retaining tab extending outwardly opposite from said concealing member, with said retaining tab engaging said upper end of said body portion to further secure said seal member to said retaining clip.

16. The weatherstrip assembly of claim 15 further including a reinforcing member adjacent to said body portion.

17. The weatherstrip assembly of claim 16 wherein said reinforcing member is fully encapsulated by said body portion.

18. The weatherstrip assembly of claim 15 wherein said leg is further defined as a first lateral arm and an upward arm extending downward from said first lateral arm with said upward arm engaging an outward face of said body portion, and where said retaining tab is further defined as a second lateral arm and a downward arm extending downward from said second lateral arm, with said downward arm engaging said outward face of said body portion, such that said seal member is secured into position relative to said retaining clip and said cover without the use of adhesives.

19. The weatherstrip assembly of claim 15 wherein said at least one sealing protrusion is further defined as at least two sealing fingers.

20. An automobile comprising a weatherstrip assembly, said automobile comprising a frame and a closure member; said weatherstrip assembly sealing between said frame and said closure member of said automobile, said weatherstrip assembly comprising:
 a retaining clip having a mounting portion for securing said weatherstrip assembly to said frame and having an outwardly extending leg defining a first channel,
 a cover having a concealing member for at least partially concealing said mounting portion of said retaining clip and said door panel, and having a first flange protruding downward from said concealing member to extend at least partially into said first channel;
 a seal member having a body portion and at least one sealing protrusion extending outwardly from said body portion, said body portion having an upper end and a lower end extending from said upper end, said lower end being sandwiched between said leg of said retaining clip and said first flange of said cover to at least partially secure said seal member to said retaining clip;
 said cover further comprising a retaining tab extending outwardly opposite from said concealing member, with said retaining tab engaging said upper end of said body portion to further secure said seal member to said retaining clip.

* * * * *